(12) United States Patent
Kell et al.

(10) Patent No.: US 9,036,625 B2
(45) Date of Patent: *May 19, 2015

(54) SYSTEMS AND METHODS OF MITIGATING PHANTOM CALL TRAFFIC

(71) Applicant: PEERLESS NETWORK, INC., Chicago, IL (US)

(72) Inventors: Scott D. Kell, Chicago, IL (US); James E. Brewer, Chicago, IL (US); Anthony J. Hiller, Chicago, IL (US)

(73) Assignee: PEERLESS NETWORK, INC., Chicago, IL (US)

( * ) Notice: Subject to any disclaimer, the term of this patent is extended or adjusted under 35 U.S.C. 154(b) by 121 days.

This patent is subject to a terminal disclaimer.

(21) Appl. No.: 13/783,994

(22) Filed: Mar. 4, 2013

(65) Prior Publication Data

US 2013/0177014 A1 Jul. 11, 2013

Related U.S. Application Data

(63) Continuation of application No. 12/469,500, filed on May 20, 2009, now Pat. No. 8,401,166.

(60) Provisional application No. 61/054,713, filed on May 20, 2008.

(51) Int. Cl.
| | | |
|---|---|---|
| H04L 12/66 | (2006.01) |
| H04M 7/00 | (2006.01) |
| H04M 15/00 | (2006.01) |
| H04M 3/42 | (2006.01) |
| H04M 7/12 | (2006.01) |
| H04Q 3/62 | (2006.01) |

(52) U.S. Cl.
CPC .......... *H04M 15/47* (2013.01); *H04M 3/42238* (2013.01); *H04M 3/42314* (2013.01); *H04M 7/1285* (2013.01); *H04Q 3/62* (2013.01)

(58) Field of Classification Search
USPC ................ 370/352; 379/221.01, 220.01, 219
See application file for complete search history.

(56) References Cited

U.S. PATENT DOCUMENTS

| | | | |
|---|---|---|---|
| 4,442,321 A | 4/1984 | Stehman | |
| 4,476,347 A | 10/1984 | Hagen et al. | |
| 5,404,350 A | 4/1995 | DeVito et al. | |
| 5,509,059 A | 4/1996 | Crevits | |
| 5,566,236 A | 10/1996 | MeLampy et al. | |
| 5,610,977 A | 3/1997 | Williams et al. | |
| 5,712,908 A * | 1/1998 | Brinkman et al. | ....... 379/114.28 |
| 5,764,745 A | 6/1998 | Chan et al. | |
| 5,844,981 A | 12/1998 | Pitchford et al. | |
| 5,930,348 A | 7/1999 | Regnier et al. | |
| 5,940,492 A | 8/1999 | Galloway et al. | |
| 5,953,403 A | 9/1999 | Lefort et al. | |
| 6,038,302 A | 3/2000 | Burok et al. | |
| 6,047,055 A | 4/2000 | Carkner et al. | |

(Continued)

*Primary Examiner* — William Deane, Jr.
(74) *Attorney, Agent, or Firm* — Marshall, Gerstein & Borun LLP; Randall G. Rueth

(57) ABSTRACT

Systems and methods for mitigating phantom call traffic in a communication system are disclosed. A call may be received at a communications exchange. A jurisdiction of the call may be determined in real-time, and egress signaling information and a route of the call to a terminating local exchange may be determined based on the jurisdiction. At least a portion of the egress signaling information may be provided to the terminating exchange in call signaling and/or in call detail billing records so that the terminating exchange is enabled to correctly charge for call termination.

20 Claims, 7 Drawing Sheets

(56) References Cited

U.S. PATENT DOCUMENTS

| | | | |
|---|---|---|---|
| 6,052,448 A | 4/2000 | Janning | |
| 6,137,869 A | 10/2000 | Voit et al. | |
| 6,282,574 B1 | 8/2001 | Voit | |
| 6,292,481 B1 | 9/2001 | Voit et al. | |
| 6,393,113 B1 * | 5/2002 | Karras | 379/133 |
| 6,393,115 B1 | 5/2002 | Krauss et al. | |
| 6,405,028 B1 | 6/2002 | DePaola et al. | |
| 6,415,151 B1 | 7/2002 | Kreppel | |
| 6,430,275 B1 | 8/2002 | Voit et al. | |
| 6,480,898 B1 | 11/2002 | Scott et al. | |
| 6,529,596 B1 | 3/2003 | Asprey et al. | |
| 6,532,288 B1 | 3/2003 | Wood et al. | |
| 6,574,201 B1 | 6/2003 | Kreppel | |
| 6,574,326 B1 | 6/2003 | Wong et al. | |
| 6,574,328 B1 | 6/2003 | Wood et al. | |
| 6,636,528 B1 | 10/2003 | Korpi et al. | |
| 6,748,071 B2 | 6/2004 | Milton | |
| 6,807,170 B1 * | 10/2004 | Dendi et al. | 370/354 |
| 6,865,266 B1 | 3/2005 | Pershan | |
| 6,870,857 B1 | 3/2005 | Clevenger | |
| 6,873,617 B1 * | 3/2005 | Karras | 370/389 |
| 6,944,150 B1 | 9/2005 | McConnell et al. | |
| 6,985,446 B1 | 1/2006 | Hurtta et al. | |
| 6,999,463 B2 | 2/2006 | Christie et al. | |
| 7,038,574 B1 | 5/2006 | Schlesener et al. | |
| 7,069,301 B2 | 6/2006 | Jerbi et al. | |
| 7,096,023 B1 | 8/2006 | Eikkula | |
| 7,123,708 B1 | 10/2006 | Gavillet | |
| 7,130,407 B1 | 10/2006 | Pesonen | |
| 7,248,576 B2 | 7/2007 | Hoffmann | |
| 7,254,109 B2 | 8/2007 | Verma et al. | |
| 7,333,441 B2 | 2/2008 | Balletti et al. | |
| 7,336,649 B1 | 2/2008 | Huang | |
| 7,340,436 B1 | 3/2008 | Lilge | |
| 7,372,869 B2 | 5/2008 | Lobig | |
| 7,406,166 B1 * | 7/2008 | Watson et al. | 379/229 |
| 7,424,103 B2 | 9/2008 | Kernohan et al. | |
| 7,617,287 B2 | 11/2009 | Vella et al. | |
| 7,738,647 B2 | 6/2010 | Davis et al. | |
| 7,889,722 B2 | 2/2011 | Thompson | |
| 7,929,676 B2 | 4/2011 | Davis et al. | |
| 2003/0131132 A1 | 7/2003 | Cheng et al. | |
| 2004/0042469 A1 | 3/2004 | Clark et al. | |
| 2005/0079864 A1 | 4/2005 | Johnson et al. | |
| 2005/0084090 A1 | 4/2005 | Moisey et al. | |
| 2005/0094623 A1 | 5/2005 | D'Eletto | |
| 2005/0186950 A1 | 8/2005 | Jiang | |
| 2005/0281399 A1 | 12/2005 | Moisey et al. | |
| 2006/0209788 A1 * | 9/2006 | Boldt et al. | 370/352 |
| 2010/0042696 A1 | 2/2010 | Vella et al. | |
| 2010/0220852 A1 | 9/2010 | Willman | |
| 2011/0085541 A1 | 4/2011 | Davis et al. | |

* cited by examiner

SYSTEMS AND METHODS OF MITIGATING PHANTOM CALL TRAFFIC

CROSS-REFERENCE TO RELATED APPLICATIONS

This application claims priority to U.S. application Ser. No. 12/469,500, entitled "Systems and Methods of Mitigating Phantom Call Traffic," filed May 20, 2009, and U.S. Provisional Application Ser. No. 61/054,713, entitled "System and Method of Providing a Single Exchange Communications Service Using a Private Network Backbone," filed May 20, 2008, the disclosures of which are hereby expressly incorporated herein by reference.

TECHNICAL FIELD

The following disclosure relates to systems and methods for mitigating phantom call traffic in a communication system. The systems and methods may use a private network backbone exchange.

BACKGROUND

Phantom call traffic is call traffic received at a terminating local communications exchange, where associated call signaling lacks sufficient information for the terminating local exchange to determine an appropriate jurisdiction of the call or a carrier responsible for call termination charges. The terminating local exchange may not be able to bill and receive compensation from responsible originating parties. Most Local Exchange Carriers (LECs), Competitive Local Exchange Carriers (CLECs) and Independent Operating Carriers (IOCs) that terminate calls at their respective local exchanges experience some degree of phantom call traffic. In some estimates, between 20% and 30% of all terminating inter-carrier traffic cannot be billed due to insufficient information, thus resulting in significant loss of revenue for the LECs, CLECs and IOCs.

Reasons for the occurrence of phantom call traffic are many and varied. Some phantom calls may have been delivered over numerous communications exchanges, each of which may be owned and/or operated by a different service provider. Differences between architectures, signaling, call detail and billing systems of these numerous communications exchanges may result in inaccurate (and in some cases, impossible) billing of termination charges. In some cases, legacy issues may exacerbate phantom traffic. For example, legacy exchanges along a call route may be limited to routing based on destination number only, and may not be able to forward sufficient detail for billing purposes. Also, inter-exchange signaling protocols may not easily support the data required for accurate billing of calls, especially with the addition of new types of communication access technologies such as wireless, broadband, and others.

Indeed, newer communication access technologies themselves may exacerbate phantom call traffic, e.g., a roaming wireless call may have a calling number that does not correspond to an exchange from which the call originates. Furthermore, in some markets, termination charges for local calls are significantly less than termination charges for access calls, thus motivating some originating or intermediate carriers to mask their carrier identity to take advantage of the lower local termination charges. Other reasons for phantom call traffic may be possible, all of which may result in insufficient information for a terminating local exchange to correctly bill termination charges, if at all.

SUMMARY OF THE DISCLOSURE

Embodiments of a computing device for mitigating phantom call traffic in a communications system is disclosed. The computing device may be coupled to a communications exchange, and may include a processor, a memory, and a call routing application stored in the memory and executable by the processor. The call routing application may include computer-executable instructions for importing a local calling area database, receiving a call from an originating carrier, determining in real-time a jurisdiction of the call based on the local calling area database, determining egress signaling information and an egress trunk group for the call based on the jurisdiction, delivering the call and the egress signaling information to a terminating local exchange via the egress trunk group, and providing at least a portion of the egress signaling information for use in a call detail record.

Embodiments of a method of determining, in real-time, a call jurisdiction and an egress trunk group of a call received at a communications exchange are disclosed. The method may include importing a local calling area database and determining the call jurisdiction primarily based on the local calling area database and a charge number associated with the received call. The call jurisdiction may be secondarily determined based on at least one of a calling number, a called number, an ingress trunk group, an originating carrier corresponding to the ingress trunk group, or a preference of a terminating local carrier.

Embodiments of methods of mitigating phantom traffic for each of local, intra-LATA (Local Access and Transport Area) and inter-LATA or toll calls received at a communications exchange are disclosed. For a received call, information pertaining to egress signaling, an egress trunk group, and billing may be determined based on at least one of an imported local call routing database, ingress signaling information, an ingress trunk group, a preference of the terminating local carrier, or an originating carrier corresponding to the ingress trunk group. The call may be delivered to a terminating local exchange in conjunction with the determined information. At least a portion of the determined information may be provided for use in a call detail record.

DETAILED DESCRIPTION

Figure 1:
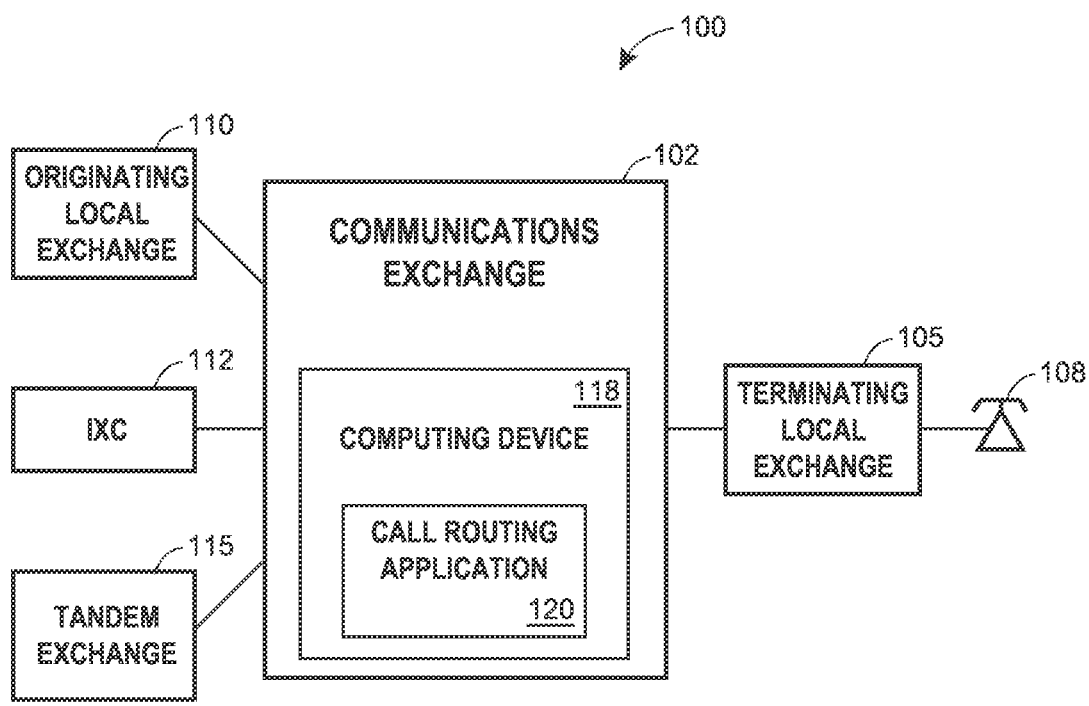
FIG. 1 illustrates an embodiment of a communications system for mitigating phantom call traffic.

FIG. 1 illustrates an embodiment of a communications system 100 for mitigating phantom call traffic. The system 100 may include a communications exchange 102 in connection with a terminating local exchange 105 at which a terminating party 108 may be reached. The communications exchange 102 may enable a reception of call traffic at the terminating local exchange 105 originating from one or more originating local exchanges 110, one or more inter-exchange carrier exchanges (IXCs) 112 or network thereof, and/or one or more tandem exchanges 115 or network thereof. Typically, the exchanges 105, 110, 112 and 115 may be connected to the communications exchange 102 via trunk groups. In this manner, the communications exchange 102 may serve as a tandem exchange through which the local exchange 105 may be accessed. A service provider or carrier that owns, operates and/or controls the terminating local exchange 105 may bill a service provider or carrier that owns, operates, and/or controls an exchange (110, 112, or 115) from which a call originated for termination charges.

As used herein, the terms "terminating local exchange," "terminating exchange," "terminating local service provider," "terminating service provider," and "customer" are used interchangeably to mean a communications service provider that owns, operates and or controls the terminating local exchange 105 to which calls are delivered. The terminating local service provider may be, for example, a LEC, a CLEC, an RBOC (Regional Bell Operating Company), an IOC, a wireless service provider, broadband or VoIP (Voice over Internet Protocol) service provider, a cable telephony service provider, or other service provider that provides communication service to end-users, such as the end-user 108. Regarding the term "customer" in particular, the terminating local service provider may be a customer of a service provider that owns, operates and/or controls the communications exchange 102.

Similarly, the terms "originating local exchange" and "originating local service provider" are used interchangeably herein to mean a communications service provider that owns, operates and or controls the originating local exchange 110 from which calls may be sent to the communications exchange. The originating local service provider may be a service provider other than the terminating local service provider.

The term "originating carrier," is used herein to mean any exchange from which a call terminating at the terminating local exchange 105 originates or its corresponding service provider. In particular, an "originating carrier" may refer to the originating local exchange 110, the IXC 112, or the tandem exchange 115, or may refer to their respective service providers.

A service provider of the tandem exchange 115 may be a same or different service provider than the service provider of the originating local exchange 110, but the service provider of the tandem exchange 115 generally (but not necessarily) may be a different service provider than the terminating local service provider. In some embodiments, the service provider of the tandem exchange 115 may be a competitive tandem service provider.

A service provider corresponding to the IXC 112 may be a service provider that provides long distance or toll communication services.

A service provider corresponding to the communications exchange 102 may be, for example, a tandem service provider or an alternative tandem service provider. The tandem service provider may be a different service provider than the service providers of exchanges 105, 110, 112 and 115.

Each of the originating and terminating local exchanges 110, 105 may be any type of local communications exchange known in the art, and may be able to support originations and terminations of voice, data or hybrid voice/data calls. For example, the originating local exchange 110 or the terminating 105 local exchange may be a LEC or CLEC-supported wired communications exchange, or may be an exchange that supports a communications access technology provided by a communications service provider, e.g., a wireless service provider, a VoIP or broadband or VoIP service provider, a cable telephony service provider, etc. In some embodiments, the originating local exchange 110 or terminating local exchange 105 may be a private exchange, such as a PBX (Private Branch Exchange) or some other essentially private switch or exchange servicing an organization such as a corporation, university, or other entity. Generally, in the communications system 100, each of the originating and terminating local exchanges 110, 105 may support any known communication access technology known in the art.

As used herein, a "communication access technology" may be any technology by which a CPE of an end-user may gain access to communication services. Examples of communication access technologies may include standard wired telephony, wireless, broadband, VoIP, cable telephony, computing or networking protocols, and others. In some embodiments, for VoIP access technologies, the CPE may use a dedicated IP connection, the Internet or some combination of the two, for example, for load-balancing, overflow, redundancy or fail-over purposes. The originating local exchange 110 and the terminating local exchange 105 may support same or different access technologies.

Of course, the number and types of exchanges 110, 112 and 115 enabled to access the terminating local exchange 105 via the communications exchange 102, as illustrated in FIG. 1, are illustrative only. In some embodiments, no tandem exchanges 115 may be connected. In some embodiments, multiple originating local exchanges 110 may be connected. Indeed, in the communications system 100, any number of any type of exchange (local 110, IXC 112 and/or tandem 115) may be in connection with the communications exchange 102.

Calls may be terminated via the terminating local exchange 105 to the end-user 108. The end-user may have a CPE (Customer Premises Equipment) that uses a type of communication access technology supported by the terminating local exchange 105. A CPE may be, for example, a landline phone, a computer, a wireless device, or other device. The end-user may be a party who has contracted with the terminating local service provider for communications service.

The communications exchange 102 may be coupled to a computing device 118. In FIG. 1, the computing device 118 is illustrated as physically incorporated into the communications exchange 118, however, physical incorporation is not necessary. In other embodiments, the computing device 118 may be physically separate from the communications exchange 102 and may be in local or remote, wired or wireless communication with the communications exchange 102 using any known communications protocol and networking configuration.

The computing device 118 may be any known computing device or computer known in the art. In some embodiments, the computing device 118 may be a plurality of physical computing devices that are jointly networked using any known networking technology. Generally speaking, the computing device 118 may be any device or plurality of network devices having memory that includes thereon stored data and computer-executable instructions. The computing device 118 may also have a processor that may be enabled to execute the computer-executable instructions. In the system 100, the memory of the computing device 118 may include computer-executable instructions for a call routing application 120 that is executable by the processor.

In some embodiments, the communications exchange 102 may be, for example, a private packet network backbone exchange (PPNBE). Details of the PPNBE will be discussed in a separate figure, but generally, the PPNBE may be a communications exchange that has a private packet network backbone. In some embodiments, the PPNBE may include the computing device 118 and the call routing application 120, and may include respective trunk group connections to the communications exchanges 105, 110, 112 and 115.

The call routing application 120 may include computer-executable instructions for mitigating phantom call traffic. In some embodiments, the call routing application 120 may contain computer-executable instructions for performing embodiments of a method of mitigating phantom call traffic. In fact, the call routing application 120 may contain computer-executable instructions for performing embodiments of one or more of the methods 200, 300, 400, 500 or 600 of the present disclosure.

Figure 2:
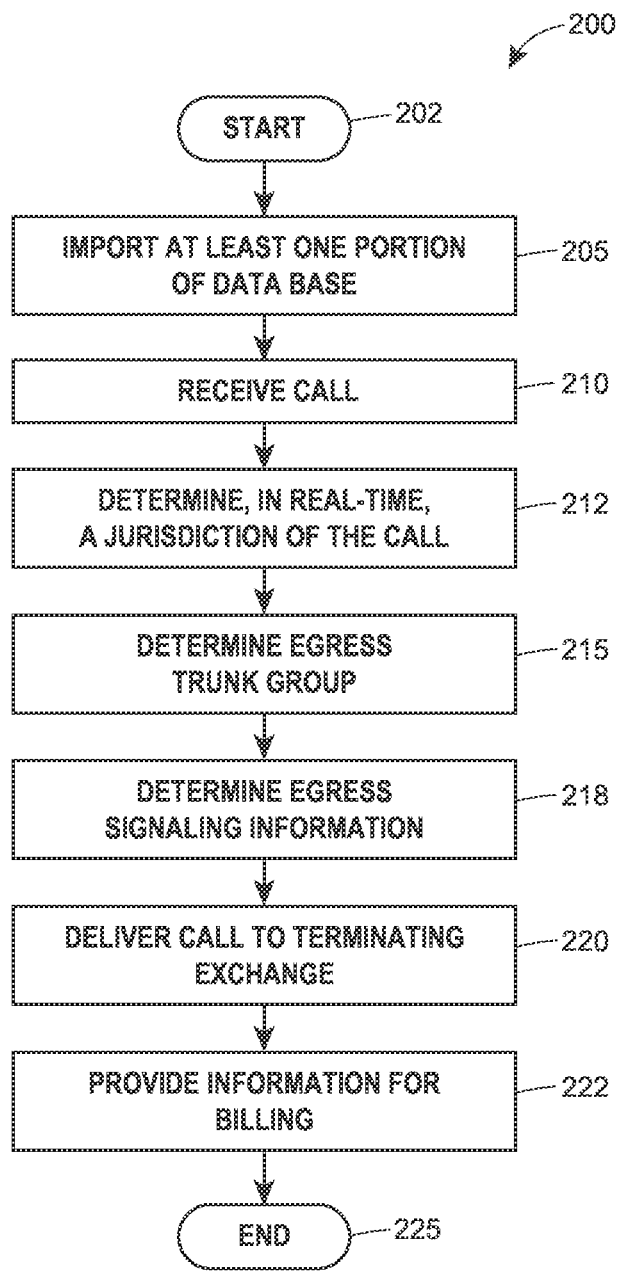
FIG. 2 illustrates an exemplary embodiment of a method of mitigating phantom call traffic.

FIG. 2 illustrates an exemplary embodiment of a method 200 for mitigating phantom call traffic. The method 200 may operate in conjunction with embodiments of the communications system 100 of FIG. 1. In some embodiments, the method 200 may be performed by the communications exchange 102, by the computing device 118, or may be performed at least in part by the call routing application 120.

At the start 202, the method 200 may import or locally store at least a portion of a local calling area database from a third-party source (block 205). The imported or locally stored local calling area database may include local calling area information that may be tariff-related, such as at least one of: a distance, a city name, an office type, a TELNUM (e.g., NPA NXX), a rate center, a state, a TELCOID or OCN (Operating Company Number), a LATA (Local Access and Transport Area), a Rate Center, a dialing pattern, a calling plan, and other information. One example of a local calling area database may be the Local Calling Area Data Source (LCADS) produced by Telecordia®.

Importing the local calling area database (block 205) may not occur on a call-by-call basis, but instead may occur (block 205) when a change at the third-party source occurs. For example, if the third-party source is Telecordia's LCADS, an import of the LCADS may occur (block 205) when an updated version of the LCADS is made available by Telecordia. In some embodiments, only a portion of the local calling area database may be imported or locally stored, such as when an updated version of the third-party source only differs slightly from a currently stored copy.

Some time after the local area calling database is imported (block 205), a call may be received from an originating carrier via an ingress trunk group (block 210). The call may include ingress signaling information including, but not limited to a charge number, a calling party number and a called party number. The call may be received via any known communications protocol, such as any in-band or out-of-band communications protocol. In some embodiments, the call may be received via an SS7 (Signaling System No. 7) protocol such as ISUP (Integrated Services Digital Network User Part).

At block 212, the method 200 may determine, in real-time, a jurisdiction of the call. The jurisdiction of a call may be an indication of a relationship between an originating end of the call and a terminating end of the call. The jurisdiction of the call may be, for example, local, intra-LATA or inter-LATA/toll. The block 212 may determine the jurisdiction of the call based upon primarily the charge number of the ingress signaling information and the imported local calling area database, and secondarily, based on the calling and called party numbers, if needed.

Based on the determined jurisdiction at the block 212, a routing path or egress trunk group for the call may be determined (block 215). The egress trunk group for the call may be determined based upon the determined jurisdiction of the call and, additionally or alternatively, based on a routing preference of the terminating local exchange. In some embodiments, the terminating local exchange may have chosen to establish both a local trunk group and an access trunk group over which to receive incoming terminations. Generally, locally jurisdictionalized calls may be received over local trunk groups, and calls having a toll jurisdiction may be received over access trunk groups. However, the terminating exchange may have indicated a preference of which type of trunk group (local or access) to use for which type of call and/or jurisdiction. In some embodiments, the terminating local exchange may have chosen to establish only a single trunk group over which to receive incoming terminations of all call types and jurisdictions.

In some embodiments, the terminating local exchange may have indicated a preference to not receive a certain type or jurisdiction of call at all. For example, the terminating local exchange may have indicated a preference to receive only local but not intra-LATA or inter-LATA calls. In another example, the terminating local exchange may have indicated a preference to receive only intra-LATA toll or inter-LATA calls, but not local calls. When a preference to not receive a certain type or jurisdiction of call has been indicated by the terminating local exchange and a call having an undesired call type or jurisdiction is received (block 210), the method 200 may gracefully release the undesired call back to the originating carrier of the undesired call (not shown). For instance, the method 200 may release the call using an ISUP Release 34 or a SIP503 (Session Initiated Protocol) message. Alternatively, the method 200 may find an alternate route or means by which to terminate the call to the called party. Thus, the undesired call may not be blocked, but instead may be re-routed over an alternate pathway.

Based on the jurisdiction of the call, the method 200 may determine egress signaling information associated with the call (block 218). The egress signaling information may include one or more parameters such as the calling number, the called number, the charge number, a CIC (Carrier Identification Code), an OCN, a LRN (Local Routing Number), a JIP (Jurisdiction Information Parameter), and/or others.

In an exemplary embodiment, if a call is determined at the block 212 to have a local jurisdiction, the block 218 may determine the JIP based on the ingress trunk group of the call, and may include the JIP in the egress signaling information. The JIP may correspond to the originating carrier from which the call was received, for example, the local originating exchange 110 or the tandem exchange 112 of FIG. 1. Typically, the JIP may be the first six digits of an LRN of the originating carrier.

In the exemplary embodiment, if the call is determined at the block 212 to have an inter-LATA or toll jurisdiction, the block 218 may not blindly transfer a CIC from the ingress signaling information into the egress signaling information. Instead, the method 200 may include a CIC in the egress signaling information that corresponds to a CIC of an IXC originating carrier from which the toll call was received, such as the IXC exchange 115 of FIG. 1.

In the exemplary embodiment, if the call is determined at the block 212 to have an intra-LATA jurisdiction, the egress signaling information may be determined based on a customer-indicated intra-LATA call routing preference. Egress signaling information for intra-LATA calls desired by the customer to be received via a local trunk group at the terminating local exchange may include a JIP corresponding to the ingress trunk group. Egress signaling information for intra-LATA calls desired by the customer to be received via an access trunk group at the terminating local exchange may include a CIC of an IXC originating carrier from which the call was received. If no customer-indicated intra-LATA call routing preference is present, then the egress signaling information for an intra-LATA call may be determined in a manner similar to that of a locally jurisdictionalized call.

In some cases, the block 212 may be unable to determine a jurisdiction (not shown). In these cases, the method 200 may determine the egress trunk group to be an access egress trunk group (block 215). The method 200 may further determine a CIC of the egress signaling information (block 218) to be a CIC corresponding to the exchange performing the method 200 (for example, the CIC of the communications exchange 102 of FIG. 1). The method may then proceed to block 220.

The call and its associated egress signaling information may be delivered to the terminating local exchange via the determined egress trunk group (block 220). The egress signaling information may be delivered via in-band signaling or via an out-of-band signaling message such as an ISUP IAM (Initial Address Message). In some embodiments, the egress trunk group may be a SIP trunk group, and the method 200 may deliver some or all of the egress signaling information to the terminating local exchange via one or more SIP Invite headers. The method 200 may enable or disable sending the one or more SIP Invite headers based on a preference of the terminating local exchange. In some embodiments, a mapping of egress signaling information into the one or more SIP headers may be as follows:

Calling number: From header
Called number: To header
Charge number: P-Charge-Info header
CIC: CIC parameter in Request-URI Some or all of the egress signaling information may be provided for inclusion in a call detail record, such as for inclusion in an EMI (Exchange Message Interface) call detail record (block 222). In some embodiments of the method 200, the block 222 may be optional. Finally, at block 225, the method 200 may end.

The method 200 may mitigate phantom call traffic in several ways. First, the method 200 may not take any position on a regulatory jurisdiction of any given call type based on potential compensation for the terminating carrier. The method 200 may recognize that routing a call over a particular trunk group does not alter a jurisdiction of the call, and thereby the method 200 may provide accuracy and transparency to call origination data. In particular, the method 200 may not rely solely (or blindly) on legacy, missing, masked, or otherwise unevaluated ingress signaling information to determine a route of the call to the terminating exchange. Rather, the method 200 may determine the jurisdiction of the call in real-time, based on not only ingress signaling information, but also the imported local calling area database, and in some cases, the ingress trunk group. In this manner, any legacy, missing or masked ingress signaling information may be mediated by the method 200 in real-time (i.e., during call-setup, routing and delivery) so that the call may be correctly routed to the terminating local exchange via a desired trunk group and may include as accurate egress signaling information as possible.

To the contrary, existing communication systems are generally unable to determine a call jurisdiction in real-time. Instead, any mediation of data for billing purposes based on the LCADS is typically performed using call detail records long after a call has completed. Typically, this mediation is done not in-real time but in a batch, post-processing manner for multitudes of calls at a time. Accordingly, any data or information that was available during real-time call setup may be lost for phantom traffic mitigation purposes as only a subset of available real-time data may have been recorded in the call detail records.

Moreover, the method 200 may bring further accuracy and transparency to inter-carrier compensation by providing some or all of the egress signaling information in detailed call records, such as in EMI records. Similar to the call routing, the method 200 may not automatically (and, in some cases, blindly) populate the detailed call records with legacy, missing, masked or otherwise unevaluated ingress signaling information. Rather, based on the jurisdiction and the egress signaling information, the detailed call records may be populated as accurately and as honestly possible with originating carrier information and other information available at call setup. The detailed call records may be exchanged with or delivered to the terminating local exchange so that the terminating carrier may use the detailed call records to accurately bill for inter-carrier compensation.

Note that the method 200 may enable the terminating carrier to receive accurate call detail or billing records for calls of any or all types of jurisdictions, including local, intra-LATA and inter-LATA calls. Currently, existing terminating local exchanges typically do not receive call detail records for local calls, but the method 200 may provide them to the terminating local exchange if desired. Thus, the terminating local exchange may receive additional accurate call data that was obtained and populated in real-time, with which to perform accurate billing of termination charges.

In cases where a particular call cannot be processed transparently by the method 200, the method 200 may gracefully release the call back to the originating exchange or may attempt to re-route the call. In this manner, any suspect calls may be gracefully turned away, thus further ensuring the accuracy and transparency of the calls that are actually delivered by the method 200 to the terminating local exchange, and their associated call detail records.

FIGS. 3-6 each depict embodiments of various blocks of the method 200 in greater detail. Each of the methods of FIGS. 3-6, though, is not required to be performed as a part of the method 200. In fact, each of the methods illustrated in FIGS. 3-6 may be performed independently or in a stand-alone mode. Additionally, each of the methods depicted in FIGS. 3-6 may be performed in conjunction with embodiments of the communications system 100.

Figure 3:
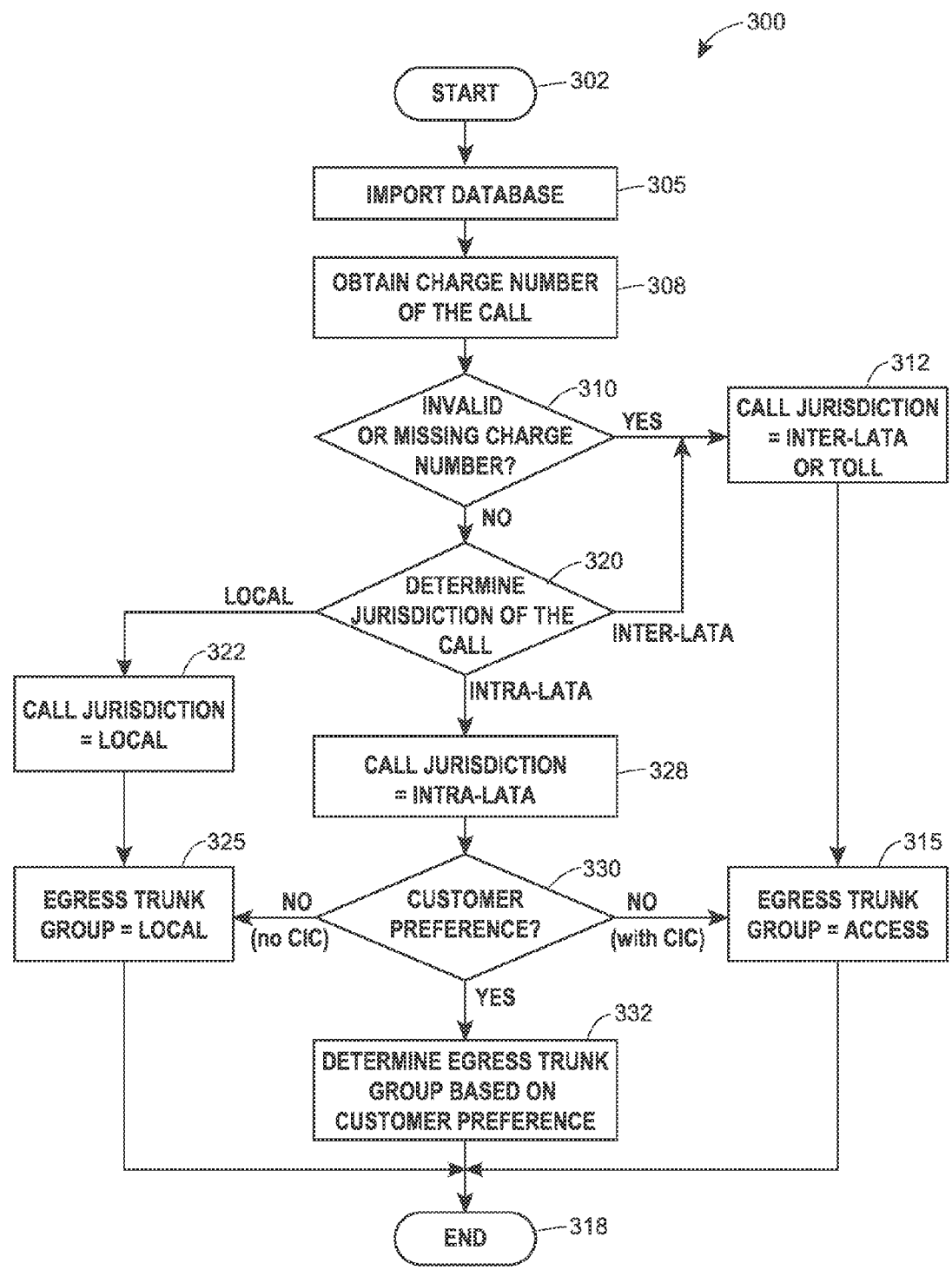
FIG. 3 depicts an exemplary method of determining, in real-time, a jurisdiction of a call.

FIG. 3 depicts an embodiment of a method of determining, in real-time, a jurisdiction of a call received from an originating carrier at a communications exchange for delivery to a terminating local exchange. The method 300 may be performed independently, or the method 300 may be performed in conjunction with the method 200, such as at the block 212 of the method 200.

At the start 302, the method 300 may import or locally store at least a portion of a local calling area database (block 305) from a third-party source, similar to the block 205 of the method 200. In fact, if the method 300 is performed in conjunction with the method 200, the block 305 may be omitted. The imported or locally stored local calling area database may include local calling area information that may be tariff-related, such as at least one of: a distance, a city name, an office type, a TELNUM (e.g., NPA NXX), a rate center, a state, a TELCOID or OCN (Operating Company Number), a LATA (Local Access and Transport Area), a Rate Center, a dialing pattern, a calling plan, and other information.

Next, a charge number corresponding to the call may be obtained (block 308). The charge number may be obtained (block 308), for example, from ingress signaling information corresponding to the call.

At block 310, the method 300 may evaluate the charge number for presence and validity. If the block 310 determines the charge number is missing or invalid, the method may jurisdictionalize the call to be toll or inter-LATA (block 312). Based on the toll or inter-LATA jurisdiction of the call, an access egress trunk group for the call may be selected or determined at block 315, and the method may end (block 318).

If, at the block 310, the method 300 determines the charge number to be valid, the method 300 may use information in the local calling routing database to determine a jurisdiction of the call (block 320). The a priori importation or local storage of some or all of the local calling routing database (block 305) at a computing device corresponding to a communications exchange at which the call is received may enable the call to be correctly jurisdictionalized and appropriately routed in real-time. In particular, during a set-up of the call, the computing device may quickly obtain needed information from the local calling routing database without requiring any communication with another computing device or entity.

If, at the block 320, the method 300 determines that the call has an inter-LATA or toll jurisdiction, the call may be jurisdictionalized as toll or inter-LATA (block 312), an access egress trunk group may be selected or determined (block 315), and the method may end (block 318).

If, at the block 320, the method 300 determines that the call has a local jurisdiction, the call may be jurisdictionalized as local (block 322). Based on the local jurisdiction of the call, a local egress trunk group for the call may be selected or determined at block 325, and the method may end (block 318).

If, at the block 320, the method 300 determines that the call has an intra-LATA jurisdiction, the call may be jurisdictionalized as intra-LATA (block 328). At block 330, a determination may be made as to whether or not the terminating local exchange has indicated a preference for intra-LATA call reception. The preference may indicate that the terminating local exchange desires to receive all intra-LATA calls via an access trunk group, all intra-LATA calls via a local trunk group, or some intra-LATA calls via the access trunk group and some via the local trunk group on a call-by-call or some other basis. At block 332, an appropriate egress trunk group may be selected or determined based on the preference of the terminating local exchange, and the method may then end (block 318).

If, at the block 330, no preference for routing intra-LATA calls has been indicated by the terminating local exchange or customer, generally, a local egress trunk group may be selected or determined (block 325). However, if a CIC is present in the ingress signaling information, an access trunk group for the intra-LATA call may be selected or determined (block 315). Finally, the method 300 may end (block 318).

Figure 4:
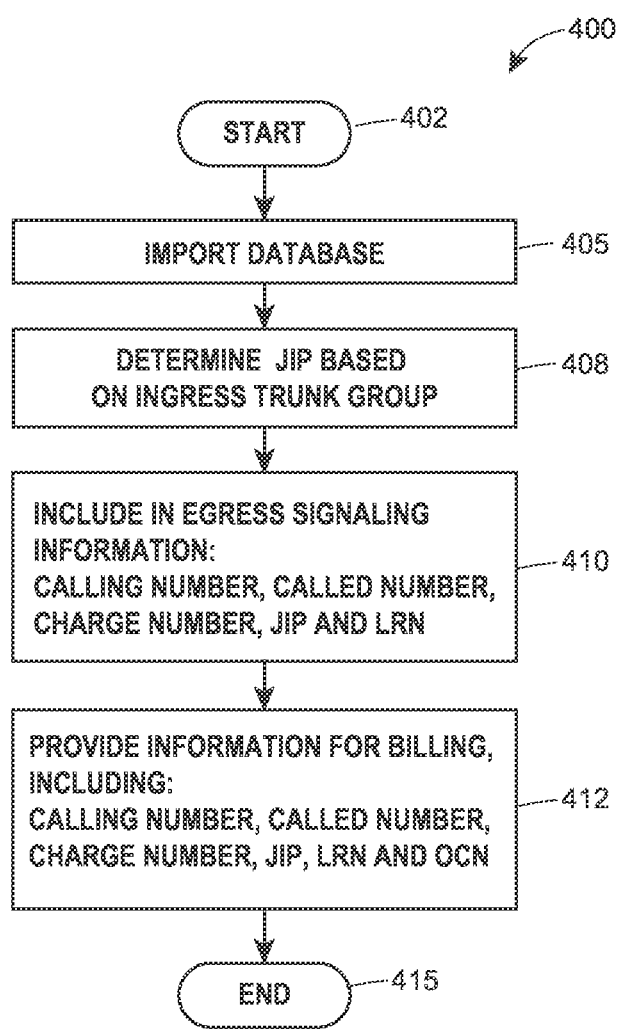
FIG. 4 depicts an exemplary method of determining egress signaling and billing information for a call having a local jurisdiction.

FIG. 4 depicts an embodiment of a method 400 for determining egress signaling information of a call having a local jurisdiction, and for providing billing information for the locally jurisdictionalized call. The call may be received from an originating carrier at a communications exchange for delivery to a terminating local exchange. The method 400 may be performed independently, or the method 400 may be performed in conjunction with the method 200 and/or the method 300.

At the start 402, the method 400 may import or locally store a local calling area database (block 405) from a third-party source, similar to the block 205 of the method 200. In fact, if the method 400 is performed in conjunction with the method 200, the block 405 may be omitted. The imported or locally stored local calling area database may include local calling area information that may be tariff-related, such as at least one of: a distance, a city name, an office type, a TELNUM (e.g., NPA NXX), a rate center, a state, a TELCOID or OCN (Operating Company Number), a LATA (Local Access and Transport Area), a Rate Center, a dialing pattern, a calling plan, and other information.

At block 408, a JIP may be determined based on an ingress trunk group of the call. In particular, the method 400 may identify the ingress trunk group of the call and may use the local calling area database to determine the JIP based on an originating carrier corresponding to the ingress trunk group and the called number.

At block 410, the egress signaling information for the locally jurisdictionalized call may be determined. The egress signaling information may be determined based on at least one of the ingress trunk group, ingress signaling information, and the local calling area database. The egress signaling information for the locally jurisdictionalized call may include at least one of the calling number, the called number, the charge number, the JIP, and an LRN of the originating carrier.

Information corresponding to the call may be provided for inclusion in a call detail record, such as an EMI call detail record (block 412). The information may include the calling number, the charge number, the JIP, the LRN of the originating carrier as the originating LRN in the call detail record, and an originating OCN corresponding to the originating carrier. The provision of this information in the call detail record may allow a terminating carrier to correctly bill the originating carrier rather than an owner of the calling number, as the owner of the calling number may not always be the originator of the call.

Similar to the method 200, in some embodiments, the block 412 may be optional in the method 400. However, by providing both correct egress signaling information (block 410) and correct billing information (block 412), the method 400 may ensure that the terminating local exchange benefits from as much accurate information as possible. For example, even when a particular terminating local exchange does not look at signaling information, the particular terminating local exchange may still be enabled to mitigate phantom traffic using billing records. Finally, at block 415, the method 400 may end.

Figure 5:
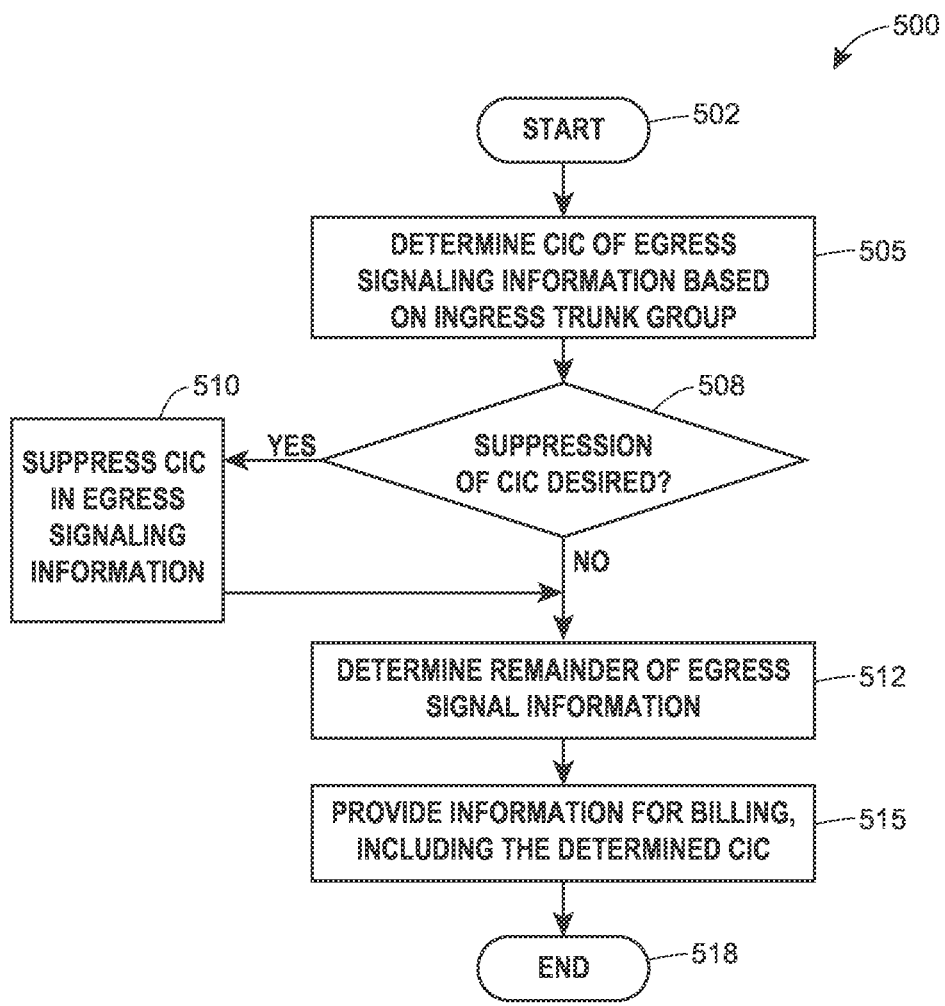
FIG. 5 depicts an exemplary method of determining egress signaling and billing information for a call having an inter-LATA or toll jurisdiction.

FIG. 5 depicts an embodiment of a method 500 for determining egress signaling information of a call having an inter-LATA or toll jurisdiction, and for providing billing information for the inter-LATA or toll call. The call may be received from an originating carrier (generally, but not necessarily an IXC) at a communications exchange for delivery to a terminating local exchange. The method 500 may be performed independently, or the method 500 may be performed in conjunction with the method 200, the method 300 and/or the method 400.

At the start 502, the method 500 may determine a CIC to be populated into egress signaling information based on the ingress trunk group of the toll or inter-LATA call (block 505). In particular, the method 500 may determine an IXC or originating carrier corresponding to the ingress trunk group of the call, and may use the CIC of the IXC in the egress signaling information. In some embodiments, the determined CIC of the IXC may be compared with data in a CIC field received from ingress signaling information. If the CIC of the IXC differs from the ingress signaling CIC, or if the ingress signaling CIC is missing or invalid, this fact may be recorded in a notification or in a log. The call, however, may still be delivered with the CIC of the IXC populated into the egress signaling information.

At block 508, the method 508 may determine if a customer-indicated suppression of the CIC is desired. If so, the CIC may be suppressed in the egress signaling information (block 510).

At block 512, a remainder of the egress signaling information may be determined, including the calling and the called number, among other information. The egress signaling information may be determined based on at least one of the ingress trunk group, ingress signaling information, and the local calling area database. As previously discussed, the egress signaling information may include the CIC of the IXC, if it was not requested to be suppressed by the terminating local exchange.

At block 515, billing information corresponding to the call may be provided for inclusion in a call detail record, such as in an EMI call detail record. The billing information may include the CIC of the IXC or originating carrier. Similar to the method 200, in some embodiments, the block 515 may be optional in the method 500. Finally, at block 518, the method 500 may end.

Figure 6:
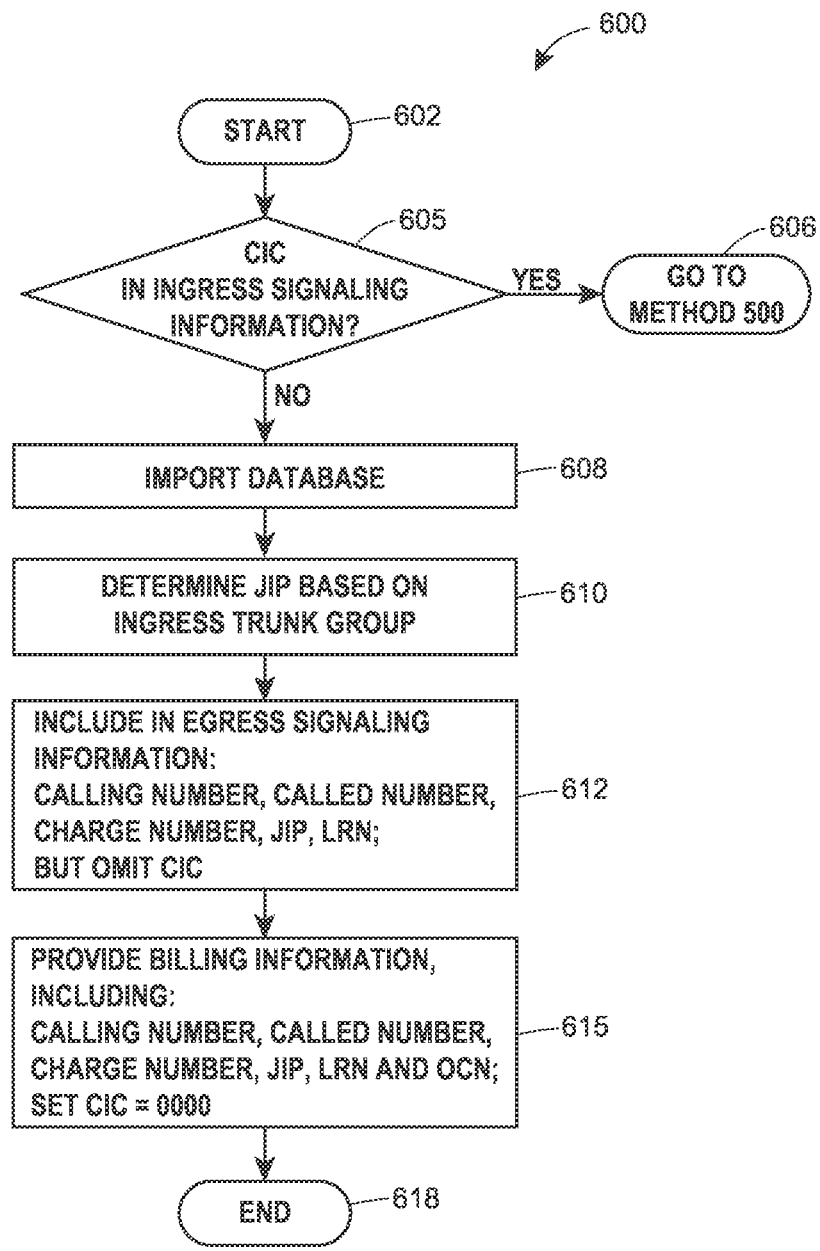
FIG. 6 depicts an exemplary method of determining egress signaling and billing information for a call having an intra-LATA jurisdiction.

FIG. 6 depicts an embodiment of a method 600 for determining egress signaling information of a call having an intra-LATA jurisdiction, and for providing billing information for the intra-LATA call. The call may be received from an originating carrier for delivery to a terminating local exchange. The method 600 may be performed independently, or the method 600 may be performed in conjunction with the method 200, the method 300, the method 400 and/or the method 500.

An intra-LATA call may be particularly susceptible to being a phantom call, as accurate identification of an originating carrier is particularly difficult. For example, current industry standards do not support OCN information passed by a conventional tandem provider to the terminating carrier as part of SS7 call setup information. Also, most conventional tandem providers do not provide the flexibility to route such calls differently from other local calls, and most conventional tandem providers do not provide EMI call detail records to the terminating carrier for calls that originate and terminate within a LATA. Furthermore, a carrier corresponding to an OCN of the calling number may not necessarily be the originating carrier of the call, for example, when an end-user such as the end-user 108 of FIG. 1 purchases local services from multiple local service providers. The method 600 may enable mitigation of these and other types of intra-LATA phantom calls.

At the start 602, the method 600 may determine if ingress signaling information corresponding to the call includes a CIC (block 605). If the block 605 determines that a CIC is included in the ingress signaling information, the intra-LATA call may be treated similar to an inter-LATA or toll call. For example, determining the egress signaling information for the intra-LATA call may use an embodiment of the method 500 (block 606).

If the block 605 determines a valid CIC is not included in the ingress signaling information, the method 600 may import or locally store at least a portion of a local calling area database (block 608) from a third-party source, similar to the block 205 of the method 200. In fact, if the method 600 is performed in conjunction with the method 200, the block 608 may be omitted. The imported or locally stored local calling area database may include local calling area information that may be tariff-related, such as at least one of: a distance, a city name, an office type, a TELNUM (e.g., NPA NXX), a rate center, a state, a TELCOID or OCN (Operating Company Number), a LATA (Local Access and Transport Area), a Rate Center, a dialing pattern, a calling plan, and other information.

A JIP may be determined based on an ingress trunk group of the call (block 610). In particular, the method 600 may identify the ingress trunk group of the call and may use the local calling area database to determine the JIP based on an originating carrier or exchange corresponding to the ingress trunk group and the called number.

Egress signaling information for the locally jurisdictionalized call may be determined (block 612). The egress signaling information may be determined based on at least one of the ingress trunk group, ingress signaling information, and the local calling area database. The egress signaling information for the locally jurisdictionalized call may include the calling number, the charge number, the JIP, and an LRN of the originating carrier. For the intra-LATA call, however, a CIC may be omitted in the egress signaling information in order to facilitate proper mediation of the call by post-processing customer mediation systems.

Billing information corresponding to the call may be provided for inclusion in a call detail record, such as an EMI call detail record (block 615). The billing information may include the calling number, the charge number, the JIP, the LRN of the originating carrier as an originating LRN in the call detail record, and an originating OCN corresponding to the originating carrier. In order to facilitate proper medication of the call by the customer mediation systems, the billing information may include a CIC set to all zeroes. Similar to the method 200, in some embodiments, the block 615 may be optional in the method 600. Finally, at block 618, the method 600 may end.

Several phantom traffic call scenarios that commonly occur in existing communications systems are described below to illustrate how the system 100 and the methods 200-600 of the present disclosure mitigate phantom traffic by providing accuracy and transparency. Consider a first example of an incoming call having an invalid call number but a valid charge number. The systems and methods of the present disclosure may determine the jurisdiction of the call based on the charge number, so the invalid call number does not affect the routing. For such a call that is jurisdictionalized as local, the call may be terminated via a local egress trunk group, and the egress signaling information may contain both the invalid calling number and the charge number. Both the invalid calling number and the charge number may be provided to the call detail record for billing.

In a second example, a call that is received with an invalid or missing calling number and an invalid or missing charge number may be jurisdictionalized as a toll call. This call may terminate to the terminating local exchange over an access local trunk group, and the egress signaling information may include the CIC of the originating carrier from which the call was received, as determined based on the ingress trunk group. The CIC of the originating carrier may be provided to the call detail record for billing.

In a third example, an inter-LATA call that is received with a missing or invalid CIC in the ingress signaling information may be jurisdictionalized as an inter-LATA call. As such, a CIC corresponding to the originating carrier from which the call may be determined based on the ingress trunk group. The CIC of the originating carrier may then be provided in both the egress signaling information and to the call detail record.

In an existing communications, any of the calls described in the previous examples would be phantom calls, and the terminating local exchange would have been unable to bill for termination charges. With the present disclosure, however, all of the calls in the above examples may be terminated with accurate and transparent signaling and billing data. The terminating local exchange is thus enabled to bill correctly and receive its fairly due revenue.

Figure 7:
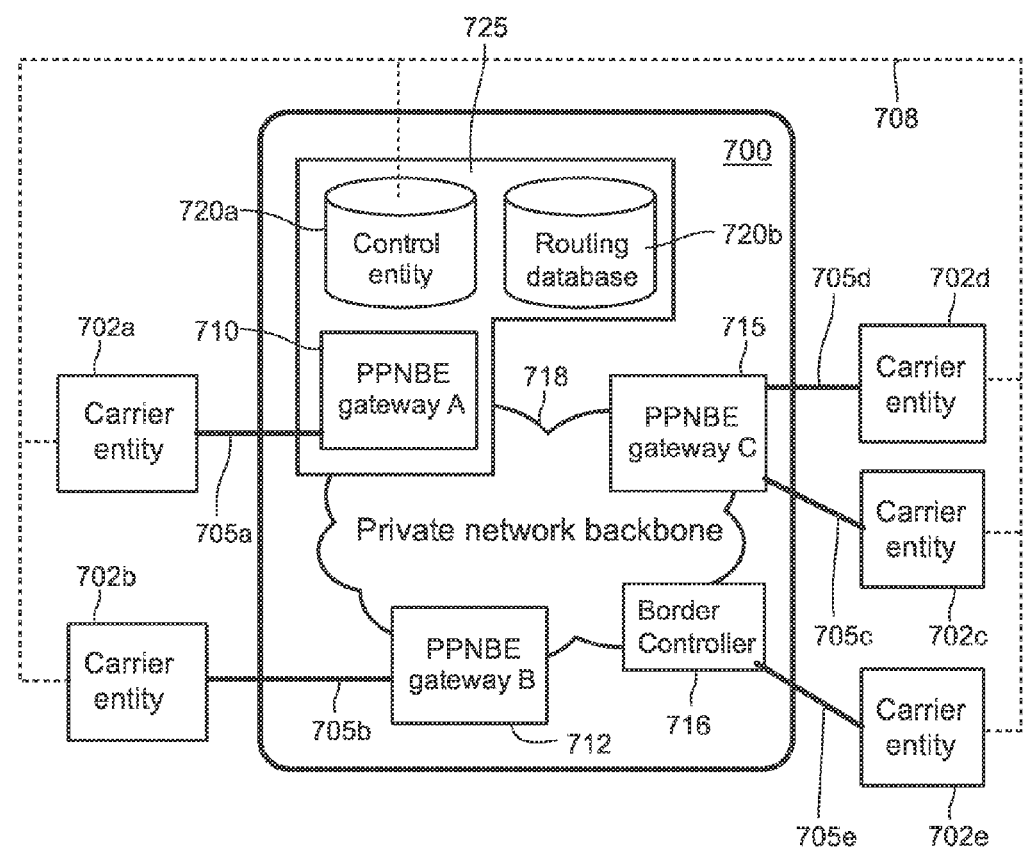
FIG. 7 illustrates an example of a private packet network backbone exchange used for mitigating phantom call traffic.

FIG. 7 illustrates an example of an embodiment of a private packet network backbone exchange (PPNBE) 700 used in mitigating phantom call traffic. The PPNBE 700 may be an embodiment of the communications exchange 102 of FIG. 1. In fact, embodiments of the PPNBE 700 may be used in conjunction with embodiments of the system 100 of FIG. 1 and with embodiments of the methods 200-600.

In FIG. 7, the PPNBE 700 may be connected to one or more carrier entities 702a, 702b, 702c, 702d, 702e. A carrier entity, as used herein, may be an entity that owns, controls, or operates communication equipment and/or provides communication service over the communication equipment. For example, a carrier entity may be a local exchange service provider, an inter-exchange carrier or long distance service provider, or a tandem service provider.

A carrier entity (702a-702e) may own, control and/or operate embodiments of one or more communications equipment or portions thereof such as the terminating local exchange 105, the originating local exchange 110, the inter-exchange carrier 112, or the tandem exchange 115 of FIG. 1. Examples of carrier entities may include, for example, wireless service providers, LECs, CLECs, RBOCs, VoIP or broadband service providers, cable telephony providers, institutions or companies owning and/or operating private communications systems, and/or other carriers/service providers. In one exemplary embodiment, the carrier entity 702a may be the originating local exchange 110, the carrier entity 702d may be the IXC 112, the carrier entity 702c may be the tandem exchange 115, and the carrier entity 702b may be the terminating local exchange 105.

Each carrier entity 702a-702e may connect to the PPNBE 700 using a call content path and a call signaling path. Call content paths (e.g., channels carrying communication traffic) are denoted in FIG. 7 by heavy thick lines 705a, 705b, 705c, 705d and 705e. Communication traffic channels 705a-705e may carry voice traffic, data traffic, a combination of the two, or other types of communication traffic using any known communication traffic protocol. Paths carrying signaling may be an out-of-band signaling network 708, such as an SS7 network or other type of signaling network, or may be in-band signaling over connections 705a-705e. In some embodiments, one or more of the connections 705a-705d between a corresponding carrier entity 702a-702d and the PPNBE 700 may be a TDM (Time Division Multiplex) connection. In some embodiments, one or more of the connections (705a-705e) may be a VoIP (Voice over Internet Protocol) connection. For example, a specific carrier entity 702e may be in communication with the PPNBE over a VoIP-type connection 705e using SIP (Session Initiation Protocol).

Call traffic may access the private packet network backbone exchange 700 via a gateway 710, 712, 715, or, in the case of VoIP connection such as SIP, a network element 716 such as a session border controller gateway. As used herein, the term "PPNBE gateway" is not limited to mean a gateway of any particular technology, but may include gateways 710, 712, 715, 716 supporting any type of communication technology, for example, a TDM- and/or VoIP-supporting gateway. Call traffic may then traverse a private network backbone 718 to an appropriate terminating PPNBE gateway (710, 712, 715, 716), and be routed from the appropriate terminating PPNBE gateway (710, 712, 715, 716) of the private packet network backbone exchange 700 to the appropriate carrier entity (702a-702e).

In some embodiments, the private network backbone 718 may include a set of privately managed nodes (not shown) to route packet call traffic. Each PPNBE gateway (710, 712, 715, 716) may convert call traffic from the protocol or format used by the originating carrier entity (702a-702e) into a packet format used by the set of privately managed nodes in the private network backbone 718. In some embodiments, the set of privately managed nodes may communicate using a packet format corresponding to an Internet Protocol format (IP). IP packets may be routed across the privately managed nodes in the private network backbone 718 to the PPNBE gateway corresponding to the carrier of the called party (710, 712, 715, 716), where the packets may be converted into a format understood by the corresponding terminating carrier entity (702a-702e). In some embodiments, the private network backbone 718 may use other types of technologies other than IP to deliver call traffic within the private network backbone 718, such as ATM or other packet or cell switching technologies.

In the private packet network backbone exchange 700, control may be performed by a logical call control entity 720a. The control entity 720a may include one or more servers or cloud computing devices, or other computing devices having a memory and having the ability to interface with a signaling network 708. Control entity 720a may provide call control as well as feature, service and other types of control needed for communication service. Control entity 720a may be represented to the PSTN, other exchanges and other networks as a single logical point code or may be identified via information in a single logical routing database 720b. Control entity 720a may or may not be physically co-located with the logical routing database 720b, but information in the logical routing database 720b may be accessible for use by the control entity 720a in establishing calls.

Carrier entities 702a-702e may transmit and receive control signals or messages via out-of-band signaling paths 708 through a signaling network. In some embodiments, the signaling network may be an SS7 signaling network, but other out-of-band signaling networks may also be used in accordance with embodiments of the disclosure. For some calls, control signals may be received in-band at a PPNBE gateway 710, 712, 715, 716. In-band control signals may be delivered to and received from the control entity 720a via the private network backbone 718.

In the embodiment of the configuration illustrated in FIG. 7, the control entity 720a, the routing database 720b, and PPNBE gateway A 710 are illustrated as being physically co-located 725. Physically co-locating the control entity 720 and the routing database 720b with other equipment such as PPNBE gateway A 710 may be beneficial for optimizing ease of maintenance and configuration of the PPNBE 700, but is not necessary. Control entity 720a and/or routing database 720b may be located anywhere and are not required to be physically co-located with any PPNBE gateway 710, 712, 715, 716 or any other equipment that is a part of the private packet network backbone exchange 700.

Control entity 720a may be scalable. As the volume of aggregate traffic through the PPNBE 700 increases, the number of physical computing devices on which the control entity 720a resides may be increased, however, the control entity 720a may still appear as a single logical point code, and/or may be accessed by the signaling network 708 via the information in the single logical routing database. If more than one physical computing device is necessary to support the call control entity 720a, the more than one physical computing device may be located locally, remotely or some combination of locally and remotely.

Likewise, in some embodiments, the single point code or routing database 720b may be scalable. The logical routing database 720b of the PPNBE 700 may be physically located across more than one local and/or remote computer-readable storage media entities, however, the logical routing database 720b may logically appear as a single logical routing database.

A local call routing database, such as the local call routing database described in FIG. 2, may be imported or copied into the routing database 720b or some other database (not shown) accessible by the call control entity 720a. The local call routing database, updates to, or complete or partial copies thereof may be received from a computing entity by any data or file transfer means known in the art.

PPNBE gateways 710, 712, 715 and 716 may be scalable. As the number of available physical connections to the PPNBE 700 desired by local service providers in a geographical area increases, a capacity of an individual PPNBE gateway may be increased. Also, if desired, additional PPNBE gateways may be added to the PPNBE 700 to provide additional trunk connections (e.g., additional communication paths) to carrier entities (702a-702e) or to new carrier entities (not pictured). The additional gateways, however, may continue to be managed by control entity 720a in conjunction with the routing database 720b for servicing calls and providing features and communication services. The PPNBE 700 may maintain the same single point code for control 720a independent of the total number and size of available PPNBE gateways 710, 712, 715, 716.

The number of nodes within the private network backbone 718 may be scalable to support a desired communication traffic volume. Similar to other elements of the PPNBE 700, the nodes within the private network backbone 718 are not required to be physically co-located, but each node merely must be in communicative connection with at least one other node in the private network backbone 718.

In one embodiment of the private packet network backbone exchange 700, the following commercial equipment may be included. Voice equipment may include:

Sonus Networks, Inc.'s Sonus PSX™ (policy server)
Sonus Networks, Inc.'s Sonus SGX (SS7 signaling gateway)
Sonus Networks, Inc.'s Sonus DSI-L0 (CDR collector)
Sonus Networks, Inc.'s Sonus DS1-L2 (Billing mediation server)
Sonus Networks, Inc.'s Sonus Insight™ EMS (element management system)
Sonus Networks, Inc.'s Sonus GSX9000 (media gateway)
Performance Technologies 6201 Mini-STP
Empirix XMS (voice monitoring system)

IP and transport equipment may include:

Force 10 (formerly Turin Networks) Traverse® 2000 (DCS)
Brocade (formerly Foundry Networks) NetIron XMR 4000 (IP router)
Brocade (formerly Foundry Networks) BigIron RX (IP router)
Brocade (formerly Foundry Networks) FastIron® Edge X448 may be used as an Ethernet switch in the private packet network backbone exchange 700.

Although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. Accordingly, it should be understood that the methods and apparatus described herein are illustrative only and are not limiting upon the scope of the claims.

Thus, many modifications and variations may be made in the techniques and structures described and illustrated herein without departing from the spirit and scope of the present claims.

What is claimed:

1. A computing device for routing a call in a communications system, the computing device coupled to a communications exchange and comprising:
   a processor;
   a memory; and
   a call routing application maintained in the memory and executed by the processor, the call routing application including computer-executable instructions for:
      receiving a call via an ingress trunk group in connection with the communications exchange, the call originating from an originating carrier and having respective ingress signaling information including a charge number;
      determining a jurisdiction of the call in real-time based on the charge number and a local calling area database accessible to the computing device, the jurisdiction of the call corresponding to a relationship between the originating carrier and a carrier of a terminating end of the call;
      determining an egress trunk group, the egress trunk group being one of a local egress trunk group or an access egress trunk group;
      determining egress signaling information based on the jurisdiction of the call; and
      delivering the call and the egress signaling information from the communications exchange via the egress trunk group.

2. The computing device of claim 1, wherein the respective ingress signaling information further includes, a calling number and a called number.

3. The computing device of claim 1, wherein the call routing application includes further computer-executable instructions for providing at least a portion of the egress signaling information for inclusion in a call detail record.

4. The computing device of claim 3, wherein the computer-executable instructions for determining the jurisdiction of the call in real-time further comprise one of:
   (i) determining the jurisdiction of the call to be local and determining, based on the ingress trunk group, a jurisdictional information parameter (JIP) corresponding to the originating carrier, wherein:
      the computer-executable instructions for determining the egress trunk group further comprise determining the local egress trunk group,
      the computer-executable instructions for determining the egress signaling information further comprise including the JIP and an LRN (Local Routing Number) corresponding to the originating carrier in the egress signaling information, and
      the computer-executable instructions for providing the at least the portion of the egress signaling information for inclusion in the call detail record further comprise providing the LRN and an operating company number (OCN) corresponding to the originating carrier for inclusion in the call detail record;

(ii) determining the jurisdiction of the call to be inter-LATA and determining, based on the ingress trunk group, a carrier identification code (CIC) of the originating carrier, wherein:

the computer-executable instructions for determining the egress trunk group further comprise determining the access egress trunk group, the computer-executable instructions for determining the egress signaling information further comprise including the CIC of the originating carrier in the egress signaling information, and the computer-executable instructions for providing the at least the portion of the egress signaling information for inclusion in the call detail record further comprise providing the CIC of the originating carrier for inclusion in the call detail record; or (iii) determining the jurisdiction of the call to be intra-LATA and determining, based on the ingress trunk group, the JIP corresponding to the originating carrier, wherein:

the computer-executable instructions for determining the egress signaling information further comprise, in the egress signaling information, including the JIP and the LRN corresponding to the originating carrier and excluding any CIC, and the computer-executable instructions for providing the at least the portion of the egress signaling information for inclusion in the call detail record further comprise providing the LRN as an originating LRN and a CIC field set to all zeroes for inclusion in the call detail record.

5. The computing device of claim 4, wherein the computer-executable instructions for determining the jurisdiction of the call to be inter-LATA further comprise at least one of:

determining that both the charge number and a calling number included in the respective ingress signaling information are invalid, determining that the charge number is invalid and that the calling number is non-local, or determining that the respective ingress signaling information includes a filled field indicating the CIC of the originating carrier.

6. The computing device of claim 1, wherein only one type of egress trunk group is coupled between the communications exchange and an exchange receiving the call, the one type selected from local or access.

7. The computing device of claim 1, wherein at least one of the local egress trunk group or the access egress trunk group is a SIP (Session Initiated Protocol) trunk group and a SIP invite header corresponding to the SIP trunk group includes at least the portion of the egress signaling information.

8. The computing device of claim 7, further comprising computer-executable instructions for delivering the SIP invite header to an exchange receiving the call based on a customer preference.

9. The computing device of claim 1, wherein the call comprises at least one of a voice call or a data call.

10. The computing device of claim 1, wherein the call is originated using any communications access technology.

11. The computing device of claim 1, wherein the communications exchange is a private packet network backbone exchange (PPNBE).

12. A method of routing a call at an exchange, comprising:

receiving a call via an ingress trunk group of the exchange, the call including respective ingress signaling information including a charge number;

determining, in real-time, a jurisdiction of the call based on the charge number and a local calling area database accessible to the computing device, the jurisdiction of the call corresponding to a relationship between a carrier of an originating end of the call and a carrier of a terminating end of the call;

selecting an egress trunk group from a plurality of egress trunk groups including a local egress trunk group and an access egress trunk group;

determining egress signaling information based on the jurisdiction of the call; and delivering the call and the egress signaling information from the exchange to a receiving exchange via the selected egress trunk group.

13. The method of claim 12, further comprising providing at least a portion of the egress signaling information for inclusion in a call detail record.

14. The method of claim 12, further comprising importing the local calling area database.

15. The method of claim 12, wherein receiving the call comprises receiving at least one of a voice call or a data call originated by any communications access technology.

16. The method of claim 12, wherein the exchange is a private packet network backbone exchange (PPNBE).

17. A system for routing a call, comprising:

means for receiving a call, the call including respective ingress signaling information including a charge number;

means for determining, in real-time, a jurisdiction of the call based on the charge number and a local calling area database, the jurisdiction of the call corresponding to a relationship between a carrier of an originating end the call in a carrier of a terminating end of the call;

means for selecting an egress trunk group from a plurality of egress trunk groups, the plurality of egress trunk groups including a local egress trunk group and an access egress trunk group;

means for determining egress signaling information based on the jurisdiction of call; and means for delivering the call and the egress signaling information to a receiving exchange via the selected egress trunk group.

18. The system of claim 17, further comprising means for importing at least a portion of the local calling area database.

19. The system of claim 17, wherein the respective ingress signaling information further includes a called number and a calling number, and wherein the jurisdiction is one of local, inter-LATA, or intra-LATA.

20. The system of claim 17, wherein a content of the call includes at least one of voice or data.

* * * * *